(12) United States Patent
Reitblat et al.

(10) Patent No.: US 12,556,547 B2
(45) Date of Patent: Feb. 17, 2026

(54) ANTI-PIRACY METHODS, DEVICES, AND SYSTEMS

(71) Applicant: Synamedia Limited, Staines Upon Thames (GB)

(72) Inventors: Lev Reitblat, Maale Adumim (IL); Steven Jason Epstein, Hashmonaim (IL); Assaf Yoself Tamir, Jerusalem (IL); Vered Anikster, Jerusalem (IL); Atara Reichman, Jerusalem (IL)

(73) Assignee: Synamedia Limited, Maidenhead (GB)

( * ) Notice: Subject to any disclaimer, the term of this patent is extended or adjusted under 35 U.S.C. 154(b) by 935 days.

(21) Appl. No.: 17/734,371

(22) Filed: May 2, 2022

(65) Prior Publication Data

US 2023/0353582 A1 Nov. 2, 2023

(51) Int. Cl.
*H04L 9/40* (2022.01)
*G06F 21/16* (2013.01)

(52) U.S. Cl.
CPC .............. *H04L 63/14* (2013.01); *G06F 21/16* (2013.01)

(58) Field of Classification Search
CPC ......... H04L 63/14; G06F 21/16; G06F 21/10; H04N 21/8456; H04N 21/44236; H04N 21/8358; H04N 21/2585
See application file for complete search history.

(56) References Cited

U.S. PATENT DOCUMENTS

| | | | | |
|---|---|---|---|---|
| 6,691,229 B1 * | 2/2004 | Nelson | ............ | G06F 21/16 713/168 |
| 6,880,081 B1 * | 4/2005 | Itkis | ............ | H04L 9/0836 380/2 |
| 7,006,631 B1 * | 2/2006 | Luttrell | ............ | H04N 19/467 348/420.1 |
| 7,010,125 B2 * | 3/2006 | Lotspiech | ............ | G11B 20/0021 725/31 |
| 7,249,383 B1 * | 7/2007 | McCully | ............ | G06F 21/16 705/52 |

(Continued)

OTHER PUBLICATIONS

B. Skoric et al., "Symmetric Tardos fingerprinting codes for arbitrary alphabet sizes," Designs, Codes and Cryptography 46.2 (2008): 137-166.

(Continued)

*Primary Examiner* — David Garcia Cervetti
(74) *Attorney, Agent, or Firm* — Fernando & Partners, LLP

(57) ABSTRACT

Anti-piracy techniques described herein are performed on a server that includes one or more processors and a non-transitory memory. The server enters a state to accumulate a portion of a bitstream extracted from parts of a clip obtained from a pirate service. The server then identifies a set of suspected piracy devices for the piracy service based on a confidence score of suspected piracy calculated for each client using the accumulated portion of the bitstream exceeding a threshold set relative to the state. The server additionally determines whether or not the set of suspected piracy devices for the pirate service satisfies a stable collusion state criterion corresponding to the state. The server enters a next state to iteratively perform the accumulating and the identifying upon determining the set of suspected piracy devices for the pirate service not satisfying the stable collusion state criterion corresponding to the state.

18 Claims, 12 Drawing Sheets

(56) References Cited

U.S. PATENT DOCUMENTS

| | | | | |
|---|---|---|---|---|
| 7,505,593 B2* | 3/2009 | Jin | G11B 20/00224 | 380/278 |
| 7,630,497 B2* | 12/2009 | Lotspiech | H04N 21/42646 | 380/201 |
| 7,711,114 B2* | 5/2010 | Lotspiech | H04L 9/088 | 380/201 |
| 7,961,887 B2* | 6/2011 | Matsushita | G06F 21/10 | 380/280 |
| 7,975,313 B2* | 7/2011 | Lotspiech | H04L 9/32 | 726/32 |
| 8,055,910 B2* | 11/2011 | Kocher | G11B 20/00086 | 713/168 |
| 8,108,928 B2* | 1/2012 | Jin | G06F 21/10 | 713/165 |
| 8,122,501 B2* | 2/2012 | Jin | H04L 9/32 | 705/57 |
| 8,290,202 B2* | 10/2012 | Carr | G06F 21/16 | 399/366 |
| 8,504,918 B2* | 8/2013 | Davidson | H04N 21/8456 | 715/721 |
| 8,571,209 B2* | 10/2013 | Bellwood | H04L 9/16 | 380/278 |
| 9,055,239 B2* | 6/2015 | Tehranchi | H04N 21/8358 | |
| 9,239,910 B2* | 1/2016 | Kim | G06F 21/10 | |
| 9,520,993 B2* | 12/2016 | Jin | H04L 63/061 | |
| 2003/0009671 A1* | 1/2003 | Yacobi | H04N 1/32144 | 713/176 |
| 2003/0026422 A1* | 2/2003 | Gerheim | H04N 21/8358 | 348/E7.056 |
| 2003/0221116 A1* | 11/2003 | Futoransky | G06F 21/125 | 713/189 |
| 2004/0111611 A1* | 6/2004 | Jin | G11B 20/00224 | 348/E7.063 |
| 2006/0048237 A1* | 3/2006 | Luo | H04N 21/8358 | 726/32 |
| 2006/0239501 A1* | 10/2006 | Petrovic | H04N 1/32203 | 380/54 |
| 2006/0239502 A1* | 10/2006 | Petrovic | H04N 1/32245 | 380/54 |
| 2006/0239503 A1* | 10/2006 | Petrovic | H04L 9/002 | 380/54 |
| 2007/0067242 A1* | 3/2007 | Lotspiech | H04N 21/42646 | 705/57 |
| 2007/0067244 A1* | 3/2007 | Jin | H04L 9/0891 | 705/59 |
| 2007/0106901 A1* | 5/2007 | Collens | G06T 1/005 | 713/176 |
| 2007/0165853 A1* | 7/2007 | Jin | H04N 21/2585 | 348/E7.063 |
| 2007/0174637 A1* | 7/2007 | Lotspiech | H04L 9/0894 | 713/190 |
| 2008/0192936 A1* | 8/2008 | Bellwood | H04N 5/913 | 348/E7.056 |
| 2008/0279376 A1* | 11/2008 | Jin | G11B 20/00427 | 380/37 |
| 2009/0034785 A1* | 2/2009 | Bellwood | H04N 21/835 | 382/100 |
| 2009/0049560 A1* | 2/2009 | Lotspiech | G06F 21/10 | 726/32 |
| 2009/0183258 A1* | 7/2009 | Isogai | G06F 21/16 | 706/54 |
| 2009/0214031 A1* | 8/2009 | Jin | H04L 9/0836 | 380/277 |
| 2009/0319227 A1* | 12/2009 | Jin | H04L 9/32 | 702/181 |
| 2009/0320130 A1* | 12/2009 | Jin | H04L 9/32 | 726/22 |
| 2009/0327739 A1* | 12/2009 | Relyea | H04L 63/0876 | 713/182 |
| 2009/0328227 A1* | 12/2009 | Cook | A63F 13/75 | 726/26 |
| 2010/0043081 A1* | 2/2010 | Kiayias | H04N 21/2585 | 713/176 |
| 2010/0284530 A1* | 11/2010 | Perez-Freire | H04L 9/32 | 380/1 |
| 2010/0287614 A1* | 11/2010 | Perez-Freire | H04L 9/32 | 726/22 |
| 2011/0182466 A1* | 7/2011 | Lin | H04N 1/32144 | 382/100 |
| 2011/0185023 A1* | 7/2011 | Jin | G06Q 10/06 | 709/206 |
| 2012/0060223 A1* | 3/2012 | Jin | G06F 21/105 | 726/26 |
| 2012/0063635 A1* | 3/2012 | Matsushita | G06T 1/0028 | 382/100 |
| 2012/0163583 A1* | 6/2012 | Nakagata | G06T 1/0021 | 380/28 |
| 2013/0132729 A1* | 5/2013 | Arnold | G09C 5/00 | 713/176 |
| 2014/0325550 A1* | 10/2014 | Winograd | H04N 21/8456 | 725/19 |
| 2015/0033026 A1* | 1/2015 | Roelse | G09C 5/00 | 713/176 |
| 2017/0251254 A1* | 8/2017 | Lotspiech | H04L 9/14 | |
| 2020/0012765 A1* | 1/2020 | Smaiely | H04L 9/3297 | |
| 2021/0357482 A1 | 11/2021 | Devir et al. | | |
| 2022/0321563 A1* | 10/2022 | Keller | H04L 63/1416 | |
| 2022/0358762 A1* | 11/2022 | Ellis | G06V 20/46 | |
| 2023/0353582 A1* | 11/2023 | Reitblat | H04N 21/8358 | |
| 2025/0013696 A1* | 1/2025 | Polishchuk | G06F 16/909 | |
| 2025/0097542 A1* | 3/2025 | Le Scouarnec | H04N 21/26616 | |

OTHER PUBLICATIONS

Gabro Tardos, "Optimal Probabilistic Fingerprint Codes," Journal of the ACM (JACM) 55.2 (2008): 1-24.

* cited by examiner

600

> For each client: (a) obtain a first subsequence of random bits based on a first probability density function; (b) obtain a second subsequence of random bits based on a second probability density function, different from the first probability density function; (c) mix the first subsequence of random bits with the second subsequence to generate the bitstream; and (d) embed the bitstream in a media content item for distribution to each client ~670
>
>> An error correction subsequence is generated according to the the first probability density function ~672
>
>> The second probability density function includes a colluder tracing function ~674
>
>> The confidence score of suspected piracy is calculated for each client device by: (a) determining whether a respective bit in the accumulated portion of the bitstream is assigned as part of the first subsequence of random bits or the second subsequence of random bits; (b) applying a first function for calculating a score of the respective bit in accordance with determining the respective bit is assigned as part of the first subsequence of random bits; and (c) applying a second function for calculating the score of the respective bit in accordance with determining the respective bit is assigned as part of the second subsequence of random bits ~676

> Enter states to identify sets of suspected piracy devices in parallel for multiple pirate services based on confidence scores of suspected piracy calculated for each client using the accumulated portion of the bitstream, where a first state entered for a first pirate service of the multiple pirate services is independent of a second state entered for a second pirate service of the multiple pirate services ~680

Figure 6C

ANTI-PIRACY METHODS, DEVICES, AND SYSTEMS

TECHNICAL FIELD

The present disclosure relates generally to anti-piracy in multimedia content delivery and, more specifically, to detecting and identifying piracy.

BACKGROUND

Collusion is a technique where videos from several sources are compared with each other and the differences between the videos are modified to make a watermark unintelligible, thus hiding the identity of the pirate. Some previously existing methods assign random bits to multimedia content streams delivered to users and detect colluder(s) by comparing a collected watermark stream from a pirate service with respective streams assigned to each subscriber and predicting the subscriber(s) who are colluding. However, the number of pirate source(s) at a given time within a system varies, and each pirate source may modify the watermark using a different and disparate number of colluding source(s). As such, previously existing methods require different anti-collusion code sizes for detecting pirate sources that use different numbers of colluders, e.g., the more colluding sources, the larger the anti-collusion code size. Such methods have cost and scalability issues.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 6A-6C are flow diagrams illustrating an anti-piracy detection and correlation method, in accordance with some embodiments.

Figure 1:
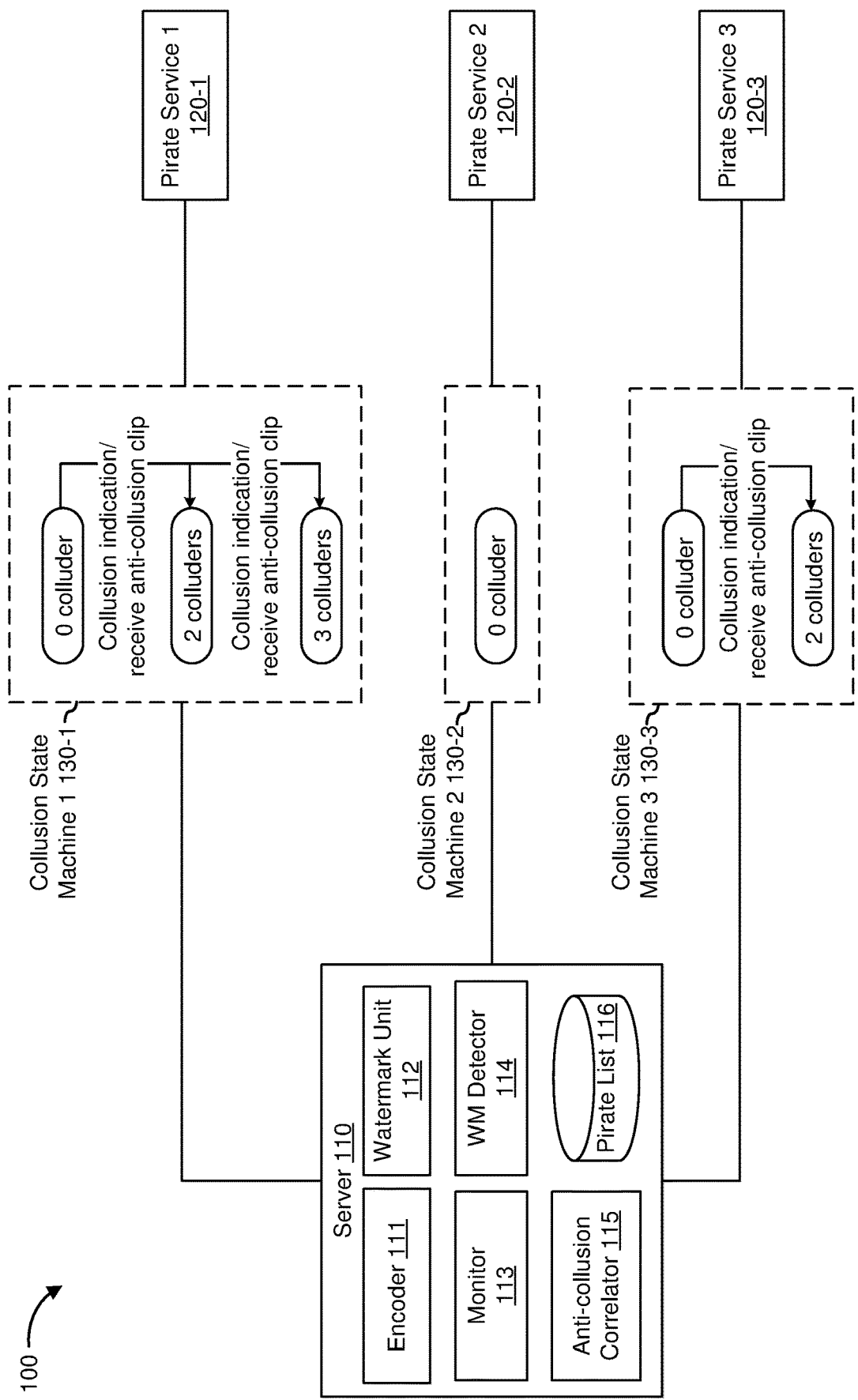
FIG. 1 is a block diagram of an exemplary anti-piracy system that utilizes collusion state machines for piracy detection and correlation, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

An anti-piracy system disclosed herein in accordance with various embodiments discovers each colluding pirate independent of the number of colluding sources as well detects no colluding pirates. Such a system is operationally viable and limits network resources and cloud costs. In some embodiments, the system creates a single random bitstream of endless (or semi-infinite) length and assigns random bits (e.g., 50/50 and/or a different distribution) in parallel to each tuned subscriber. Further, in some embodiments, the system includes a piracy monitor, a watermark detector, and an anti-collusion correlator. The system maintains the collusion states of each pirate service and requests the monitor to collect clips from the pirate services and upload different size clips (e.g., multi-part upload) for iterative piracy detection and collusion correlation by the watermark detector and the anti-collusion correlator. In particular, according to the collusion states, initially, the system assumes pirates do not collude, e.g., a single non-colluding pirate. The monitor then collects and extracts the smallest clip, e.g., small enough to detect piracy without collusion. Further, for those suspected colluding pirates, the monitor collects a larger clip size that enables the detection of two colluders. In some embodiments, the monitor further increases the clip size, e.g., an even larger clip, for those suspected colluding pirates, and so on, until every colluder is identified for each pirate service.

In accordance with various embodiments, an anti-piracy method is performed at a server that includes one or more processors and a non-transitory memory. The method includes entering a state to accumulate a portion of a bitstream extracted from parts of a clip obtained from a pirate service. The method further includes identifying a set of suspected piracy devices for the piracy service based on a confidence score of suspected piracy calculated for each client using the accumulated portion of the bitstream exceeding a threshold set relative to the state. The method additionally includes determining whether or not the set of suspected piracy devices for the pirate service satisfies a stable collusion state criterion corresponding to the state. The method also includes entering a next state to iteratively perform the accumulating of a next portion of the bitstream extracted from subsequence parts of the clip obtained from the pirate service and the identifying according to the confidence score of suspected piracy exceeding a next threshold set relative to the next state in accordance with a determination of the set of suspected piracy devices for the pirate service not satisfying the stable collusion state criterion corresponding to the state.

Example Embodiments

As explained above, various piracy detection methods and systems have been proposed and developed to analyze altered watermarks found in unauthorized copies. One such technique for digital watermarking has been proposed by Gabor Tardos in "Optimal Probabilistic Fingerprint Codes"

in *Proceedings of the Symposium on the Theory of Computing (STOC)* '03, pages 116-125, 2003, the contents of which are incorporated herein by reference. In the reference (hereinafter referred to as "Tardos"), a digital watermark (also referred to hereinafter as a "fingerprint code", a "Tardos fingerprint code", "Tardos bits", or a "Tardos code") is proposed, where individual users are given equivalent copies of content that have slight variations assigned according to a fingerprint code. If a pirated copy of the content is later obtained, it would be possible to detect at least one of the users who leaked the pirated copy, even if multiple users have colluded to construct a pirated copy by mixing the different variations that they have.

The Tardos fingerprint code technique assumes that when a group of colluding attackers analyze multiple copies of the same content and find only a single symbol at a given position in the code, then the attacker would insert that symbol in the code. However, if the attackers observe more than one symbol at a given position in the different copies of the content, they might insert any symbol, including an unreadable symbol, or a symbol they have not seen in the copies. For streaming content, systems can assign some form of Tardos bits to each user stream, where the Tardos bits enable detection of colluder(s) by comparing a piracy monitor collected watermark embedded stream from a pirate service with streams assigned to subscribers. The Tardos bits have a length that is proportional to the square of the number of colluding attacker(s) that could be detected.

$$\text{the number of Tardos bits} = O\left(c^2 * \log\frac{n}{\varepsilon}\right)$$

where c: the number of colluders; n: population size; and ε: an acceptable false positive rate.

The Tardos code length was a significant improvement over the previous state of the art. Reducing code length is important because longer code length imposes a greater computational and memory burden on systems processing the content. Also, a longer code length may increase the perceptibility of the code and may degrade the quality of the content to the user. Yet even with Tardos bits, there are issues when using a separate number of colluders concurrently for detecting pirate sources (e.g., client device(s) used by pirate (s) for obtaining copies of media content and contributing to collusion attacks), since each pirate source would typically require a different watermark identifier (ID) (WMID) size. For example, to locate any pirate independent of how many colluders it is using, separate campaigns can be scheduled to catch different numbers of colluding sources. Typically, the size of the clip is proportional to the number of Tardos bits, e.g., the size of the clip=Tardos bits*segment size. Assuming the segment size is 6 seconds, for example, multiple campaigns shown in the table below would be run to eventually catch colluding sources with different numbers of colluders.

TABLE 1

| Date | Campaign Type | Watermark Size | Clip size |
|---|---|---|---|
| September 1-10 | non-colluding pirates | 24 bits | 2.4 minutes |
| September 11-12 | 2-colluder pirates | 150 bits | 15 minutes |
| September 13-14 | 3-colluder pirates | 290 bits | 29 minutes |
| . . . | . . . | . . . | . . . |

The table above illustrates several issues of using Tardos bits for anti-piracy. First, it is operationally problematic to continuously schedule different size watermarks over time and synchronize with the monitor. For instance, pirates may re-broadcast videos leaked from one campaign type period (e.g., a 15-minute clip campaign) to another campaign type period to avoid detection, e.g., avoiding detection in a 29-minute clip campaign. Second, it could waste significant amounts of network and cloud resources. For instance, the system may extract a 29-minute clip from a non-colluder pirate that started piracy on September 13th when a 2.4-minute clip would have been sufficient, thus wasting valuable network resources and adding significant cloud detection costs. Third, the schedule-based approach cannot cover every number of colluders on a regular basis and there are an infinite number of permutations. Further, the above schedule-based strategy cannot apply to video-on-demand (VOD) content since the VOD content consumption can happen at any time. Additionally, some colluder tracing functions are based on assumptions that are impractical for commercial applications. For example, Tardos codes assume that there are no errors in bit detection, which is not possible for many practical applications.

Accordingly, an anti-piracy system described herein in accordance with various embodiments solves the aforementioned issues. The anti-piracy system sends the same stream to each client but the clips extracted by the monitor vary in size for each pirate service. Once a pirate is suspected of stealing the watermarked content, the piracy monitor uploads multiple contiguous segments to enable variable detection rates depending on the number of pirate(s) or colluder(s) for the pirate service. Because the system cannot know in advance for pirate service whether the collusion is done and the number of pirate(s) participating in the collusion, using the anti-piracy system described herein, even though the identifier(s) of colluder(s) associated with a particular pirate service cannot be detected with sufficient confidence when using a smaller clip size, the system can collect enough information from the smaller clip to suspect the pirate service using a greater number of colluders and continue the clip collection process and the iterative detection and collusion correlation to identify more colluder(s).

In some embodiments, the stream to each subscriber is a single random bitstream of endless (or semi-infinite) length, and the server assigns random bits (e.g., 50/50 of value "0" or "1" or a different distribution) in parallel to each client. The variance in the monitoring of different pirate services thus becomes the size of clips. In some embodiments, the clip size for each pirate service is based on the number of colluders predicted for the particular pirate stream at any particular time by a server. As such, the same stream is sent to each client but dependent on a collusion state, the clip extracted by the monitor varies in size at a different time for each pirate service. Further, even when the ID(s) of the colluder(s) for a particular pirate service cannot be detected with sufficient confidence when using a smaller clip size, the system can still collect enough information from the smaller clip(s) to suspect that a greater number of colluders is colluding for the particular pirate service, e.g., the ability to suspect collusion from the smaller clip size to iteratively detect and correlate colluders. As such, relative to previously existing anti-piracy systems, the system described herein improves operational efficiency, conserves network resources, and reduces cloud costs.

Reference now is made to FIG. 1, a diagram illustrating an exemplary anti-piracy system 100 that utilizes collusion state machines for piracy detection and correlation in accordance with some embodiments. In FIG. 1, a server 110 includes a watermark unit 112 for assigning watermark bits and/or embedding the watermark bits to multimedia content encoded by an encoder 111. The multimedia content includes, for example, an image, movie, audio, and/or text, etc. As used herein, "multimedia content" is also referred to as "media content", "media content item", or "content". In some embodiments, the watermark embedded content is distributed to client devices, and the watermark bits embedded in the content delivered to a respective client device correspond to a client identifier (ID) associated with the client device, e.g., a user ID, an account ID, a session ID, and/or a device ID. As used herein, "a client" can refer to "a client device", "a user", "a subscriber", and/or "an account".

A collusion attack, as described previously, may be made on watermark-embedded content. The attackers may merge one or more watermark-embedded elements of the media content so that the watermark ID in the resulting content would not correspond to a single client ID. In particular, a plurality of pirate services 120, e.g., pirate service 1 120-1, pirate service 2 120-2, pirate service 3 120-3, etc., may utilize one or more client devices, each used by a pirate to perform the collusion attack. A respective pirate service 120 can be, for example, a pirate website and/or an Internet-based protocol television (IPTV) network. The pirate service 120 may utilize one or more client devices to steal content from the server 110, perform collusion attacks, and then illegally resell and/or re-distribute the pirated content to viewers.

To resist collusion attacks and/or other non-collusion piracy, in some embodiments, the watermark unit 112 assigns bitstreams as watermark IDs to enable the detection of any number of colluder(s). Further, in some embodiments, the server 110 includes a monitor 113, a watermark detector 114, and an anti-collusion correlator 115 for monitoring the pirate services 120, collecting clips from the pirate services 120, detecting possible collusion attacks by the pirate services 120 based on the clips, and/or correlating colluder(s) for each of the pirate services 120. As used herein, "a colluder" is also referred to as "a pirate" and vice versa. The system 100 is capable of not only detecting multiple colluders participating in collusion attacks, but also identifying a non-colluding pirate, which also is referred to hereinafter as a pirate in the case of 0-colluder, e.g., the pirate for pirate service 2 120-2.

In some embodiments, as will be described in further detail below with reference to FIGS. 3A-3C, the monitor 113 performs multi-part uploads of clips so that the watermark detector 114 and the anti-collusion correlator 115 execute collusion state machines 130 to detect the number of colluder(s) for each pirate service 120 and identify the colluder(s), e.g., executing collusion state machine 1 130-1 to identify 3 colluders for pirate service 1 120-1, executing collusion state machine 2 130-2 to identify 1 non-colluding pirate for pirate service 2 120-2, and/or executing collusion state machine 3 130-3 to identify 2 colluders for pirate service 3 120-3, etc. Upon identifying the clients for the pirate services 120, the server 110 disrupts the services to such clients for the pirate services 120. In some embodiments, the server 110 further includes a pirate list 116 for storing a list of the client IDs identified as being used by the pirates and blocks services (e.g., rejecting content requests) to the client IDs on the pirate list 116.

It should be noted that components are represented in the exemplary anti-piracy system 100 for illustrative purposes. Other configurations can be used and/or included in the exemplary anti-piracy system 100. Further, components can be divided, combined, and/or re-configured to perform the functions described herein. For example, at least a portion of the watermark unit 112 can be located on client devices, such that the watermark embedding can be facilitated by client devices. In another example, the encoder 111 and other components can reside on the same server 110 or on a separate server that is distinct from the server 110. Likewise, each of the monitor 113, the watermark detector 114, the anti-collusion correlator 115, and/or the pirate list 116 can reside on the same server 110 or on a distinct server. Additionally, the exemplary anti-piracy system 100 can include other subcomponents to facilitate anti-piracy operations. Various features of implementations described herein with reference to FIG. 1 can be embodied in a wide variety of forms, and that any specific structure and/or function described herein is illustrative.

Figure 2:
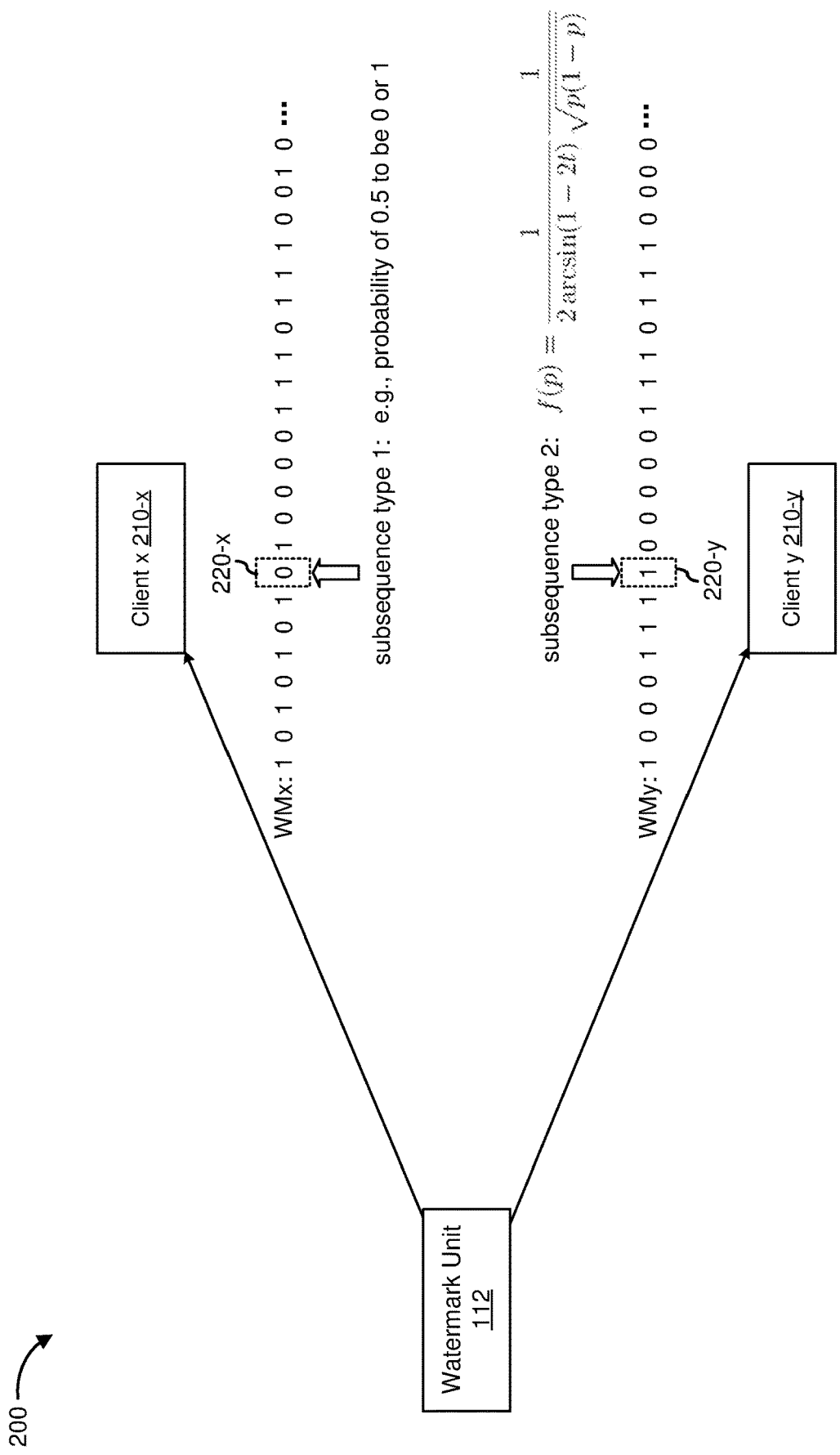
FIG. 2 is a diagram illustrating bit assignments for piracy detection and correlation, in accordance with some embodiments.

FIG. 2 is a diagram 200 illustrating bit assignments by the watermark unit 112 in accordance with some embodiments. In some embodiments, the watermark unit 112 assigns a unique sequence of random bits to each client within a population (e.g., N clients) so that the exemplary system 100 as shown in FIG. 1 can detect non-colluders (e.g., pirates that do not collude) or any number of colluders using the fewest number of bits possible with the shortest amount of detection time. For example, the watermark unit 112 can assign a sequence of bits as watermark x to client device x 210-$x$ and assign another sequence of bits as watermark y to client device y 210-$y$.

In some embodiments, each sequence of bits includes a mixture of multiple types of subsequences. For example, the first subsequence type can be a sequence of random bits, where each bit has a probability of 0.5 to be 0 or 1, or other error correction codes, e.g., Hadamard codes; whereas the second subsequence type can be a sequence of random bits for colluder tracing, e.g., generated according to a standard Tardos clipped arcsine distribution. One such probability density function as follows has been described by B. Skoric, S. Katzenbeisser, and M. Celik in "Symmetric Tardos fingerprinting codes for arbitrary alphabet sizes" in *Design Code Cryptography* 46 (2), pages 137-166, 2008, the contents of which are incorporated herein by reference.

$$f_q(p) = \frac{1}{2\sin^{-1}(1-2q)} \frac{1}{\sqrt{p(1-p)}}$$

where a distribution clip size q<<1, e.g., a small value such as q=0.001.

In some embodiments, the first subsequence type allows the system to detect pirate ID(s) when non-colluding pirate or 2 colluders are used since the random bits are effective for the most typical collusion attacks. Further, the random bits generated according to the first subsequence type are also very robust to possible bit detection errors caused in addition to collusion attacks (e.g., video quality attacks). As described above, Tardos codes assume that there are no errors in bit detections. Such an assumption is impractical in commercial settings. In contrast, the bit assignment method described herein in accordance with some embodiments does not assume that a bit detection channel is noise-free. As such, using a sequence of random bits or other error correction codes as the first subsequence type addresses the issues associated with bits generated according to certain colluder tracing functions (e.g., Tardos codes). In spite of the high performance of the first subsequence type, some rare collusion attacks exist with 3 or more colluders. To get a solution that is also effective for such rare attacks, the watermark unit 112 mixes the first subsequence type with the second subsequence type, e.g., by selecting from either the first subsequence type or the second subsequence for each bit in the bitstream. The mixture allows the system to efficiently detect most of the common attacks with the first subsequence type without compromising on the detection of possible rare attacks using the second subsequence type.

In the example shown in FIG. 2, when assigning bits to watermark x for client device x 210-*x* the watermark unit 112 randomly selects for each bit whether to use the first subsequence type or the second subsequence type. Likewise, when assigning bits to watermark y for client device y 210-*y* the watermark unit 112 randomly selects for each bit whether to use the first subsequence type or the second subsequence type. As such a result, for bit 220-*x* in watermark x, the watermark unit 112 selects the first subsequence type and randomly assigns value 0; and for bit 220-*y* in watermark y, the watermark unit 112 selects the second subsequence type and assigns value 1 according to the probability density function.

In some embodiments, the choices of which subsequence type to use and the mixing of the bits from multiple subsequence types are flexible and configurable. For example, the system can configure the mix differently for different applications. Also, there are no predefined proportions of bits assigned according to different subsequence types. For example, in the case of the system receiving an indication of occurrence(s) of a particular type of collusion attack, the system can assign 100% of the bits according to one subsequence type that is the most effective for detecting and correlating the particular type of collusion attack. In another example, when the system stores a list of suspected pirates in the pirate list 116 (FIG. 1), the system can adjust the mixture of the bitstream so that the bitstream delivered to the client devices in the pirate list 116 receives more bits from certain subsequence types to target a certain type of collusion attacks.

It should be noted that the probability density functions shown in FIG. 2 are exemplary. For example, it is possible to replace the random code generation for the first subsequence type with a different code generation method to supplement the second subsequence type. Likewise, probability density functions based on other fingerprinting schemes and/or other colluder tracing functions other than Tardos can be used as the basis for generating bits. Further, although FIG. 2 illustrates two subsequence types, the watermark unit 112 can choose from more than two subsequence types and each subsequence type uses a different probability density function. Additionally, although FIG. 2 shows generating binary values and assigning binary values as watermark IDs, various embodiments can use non-binary symbols and/or alphabets in accordance with various fingerprint schemes.

Figure 3A:
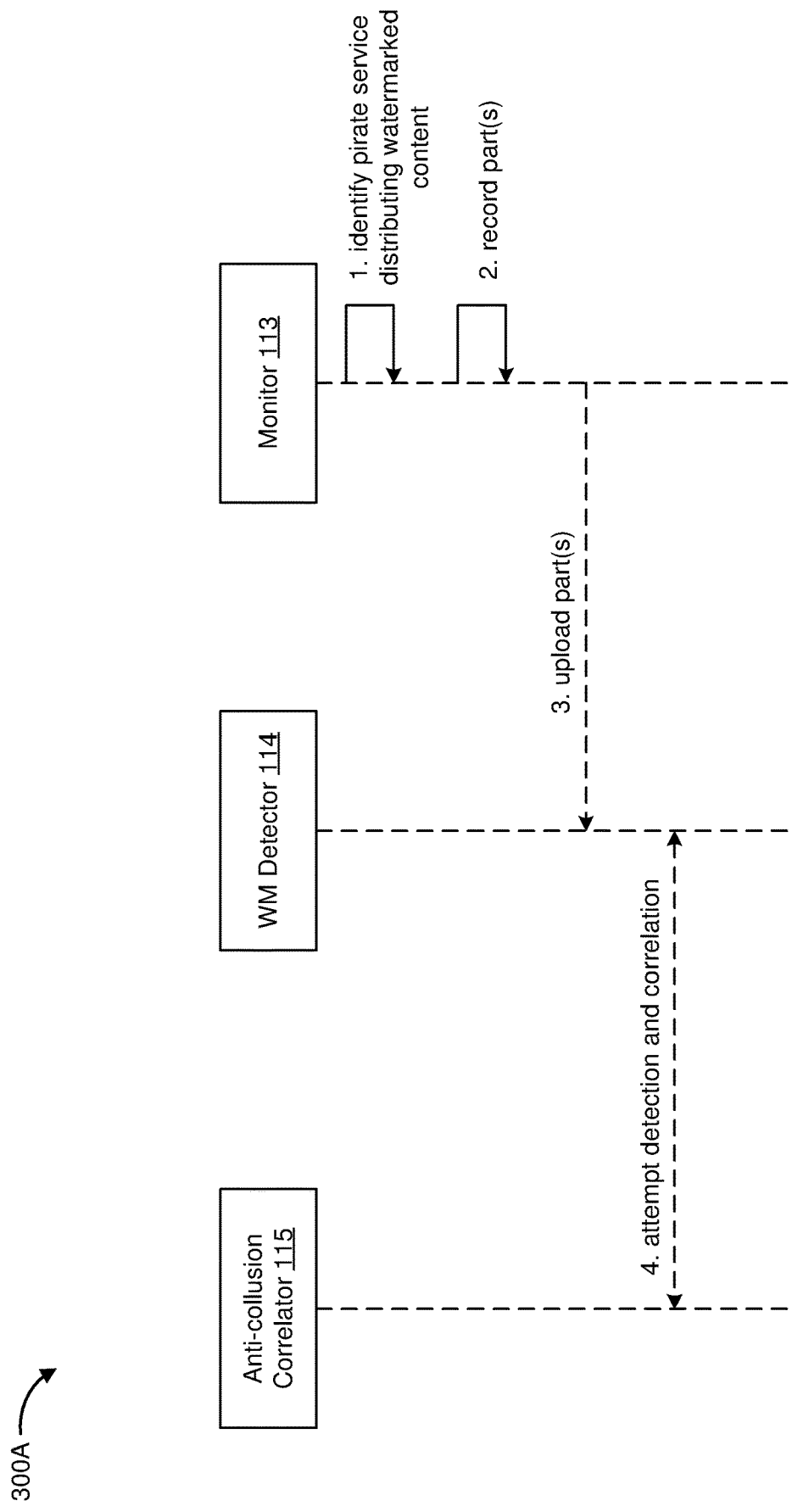
FIGS. 3A-3C are diagrams illustrating multi-part uploads for piracy detection and correlation, in accordance with some embodiments.

FIG. 3A is a sequence diagram 300A illustrating multi-part uploads for piracy detection and correlation in accordance with some embodiments. In some embodiments, in step 1, the monitor 113 identifies a pirate service, e.g., a pirate website or IPTV network, that steals watermarked content and distributes the watermarked content. Having identified the pirate service, starting from step 2, the monitor 113 records and uploads various parts to enable variable detection rates, e.g., obtaining multiple contiguous segments of videos or a sub-clip of a video from the pirate service with colluded watermarks.

In step 2, in some embodiments, the monitor 113 records part(s) of the watermarked content distributed by the pirate service, e.g., contiguous segments of a video or a sub-clip of the video with colluded watermarks. In step 3, having obtained the recorded content from the pirate source, the monitor 113 uploads the part(s) to the watermark detector 114. In step 4, the watermark detector 114 along with the anti-collusion correlator 115 attempt the detection and correlation after receiving the part(s), e.g., attempting the detection and correlation after each part or determining whether there are sufficient parts to attempt detecting piracy and correlating colluders.

Figure 3B:
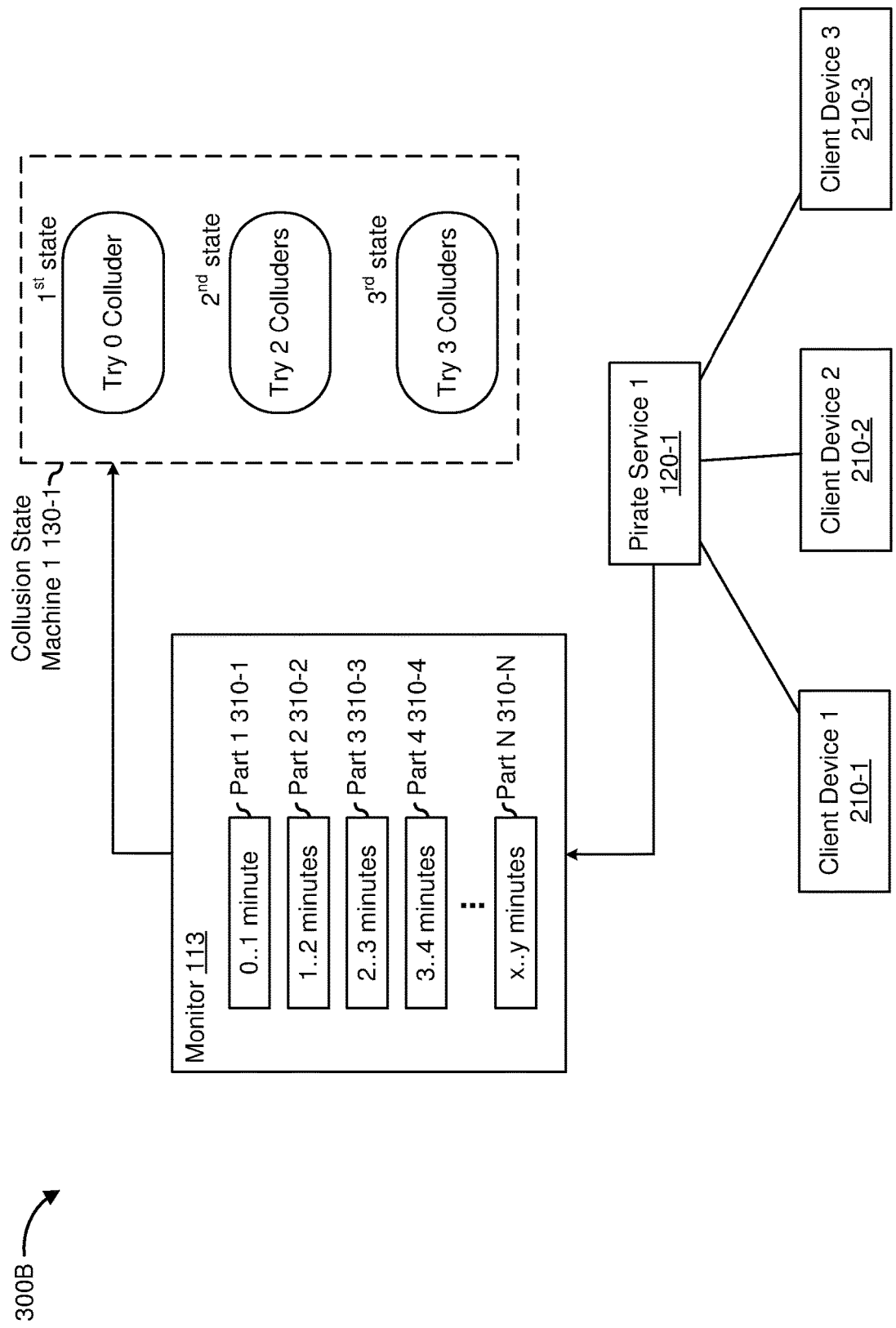

FIG. 3B illustrates an exemplary multi-part upload process 300B for executing collusion state machine 1 130-1 (FIG. 1) according to the information in Table 1 above. In FIG. 3B, the monitor 113 records clips of watermark embedded content from pirate service 1 120-1 one after another and uploads the sub-clips to the watermark detector (e.g., the watermark detector 114 in FIG. 1) on the server, where pirate service 1 120-1 uses client device 1 210-1, client device 2 210-2, and client device 3 210-3 for collusion attacks. In FIG. 3B, the watermark detector, in conjunction with the anti-collusion correlator, attempts the detection and correlation after receiving each uploaded part. Further, in some embodiments, the watermark detector tries any number of colluders in parallel, e.g., trying 0-colluder in the first state, 2-colluder in the second state, and/or 3-colluder in the third state in parallel. As such, the system learns based on realizing a stable condition associated with how many colluders there are after this number of parts.

It should be noted that although FIG. 3B illustrates one collusion state machine, e.g., collusion state machine 1 130-1, for pirate service 1 120-1, the collusion detection and correlation process is different and independent for different pirate services as shown and described above with reference to FIG. 1. As such, the execution of the collusion state machine for one pirate service does not affect the execution of the collusion state machine for another pirate service. As such, for different pirate services, the number of parts uploaded by the monitor 113 may be different and the results may stabilize on different sets of colluders. It should also be noted that when executing collusion state machine 1 130-1, the number of colluders is not an input parameter of the correlation function. Rather, the states in collusion state machine 1 130-1 are the results of executing the iterative collusion detection and correlation. After obtaining the detection results, a single loop of correlation is executed for users in the population. The output of the correlation is a set of client IDs, where each client ID in the set has a correlation result, e.g., a score, that is above a threshold T defined for the state. The number of colluders found thus is the size of the set of client IDs. Further, as will be described below with reference to FIG. 4B, the threshold T is a function of the number of bits in the clip, which is also not a function of the colluders. As such, although the system does not know in advance for pirate service 1 120-1 the number of colluders participating in the collusion, using the collusion detection and correlation techniques described herein, the system can collect sufficient information to identify the number of colluders once satisfying a stable collusion state criterion.

Figure 3C:
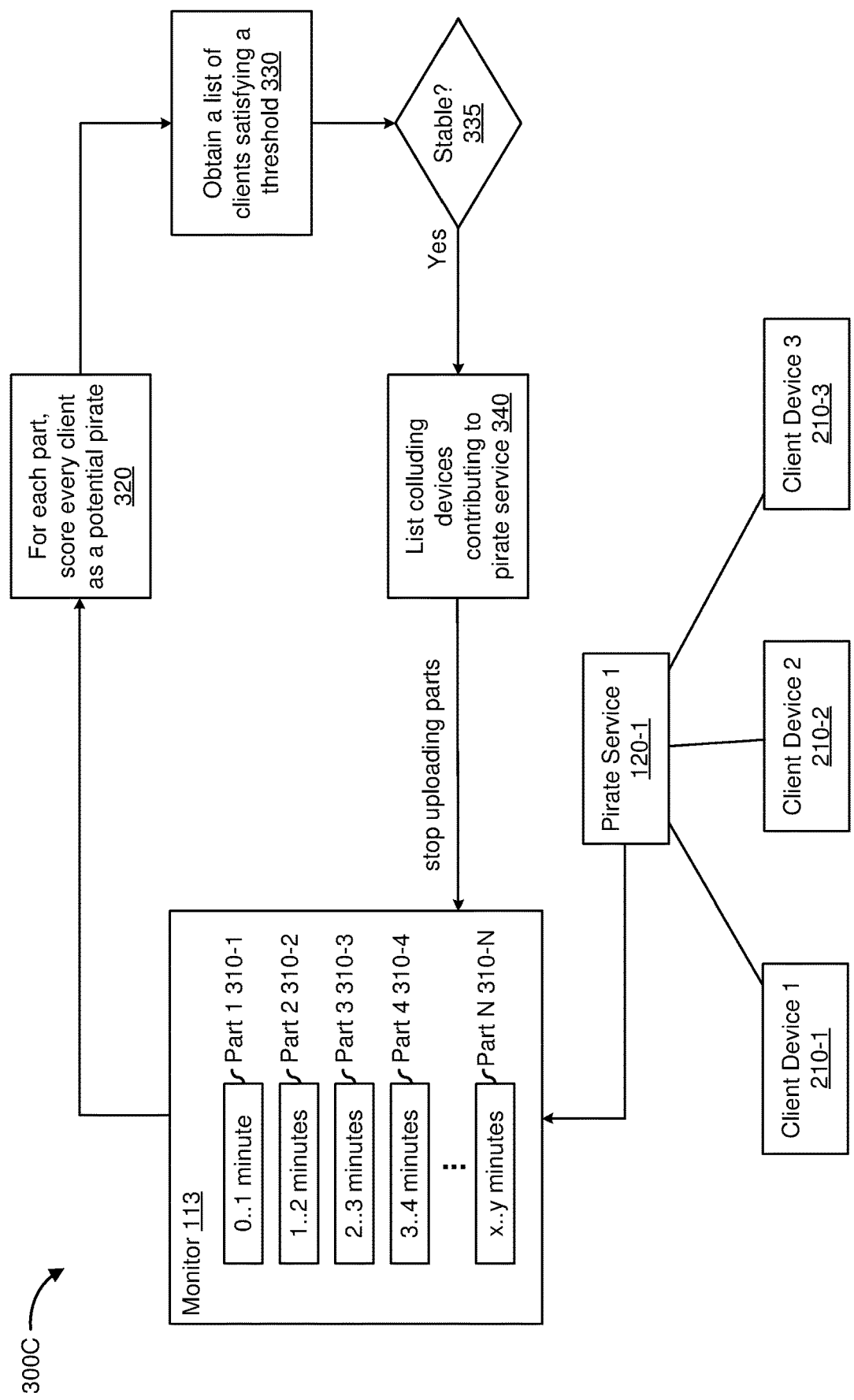

For instance, FIG. 3C is a diagram 300C illustrating the exemplary system 100 locating a set of stable colluders after each and every part and recording the colluders when passing the stability condition. In FIG. 3C, pirate service 1 120-1 uses three client devices 210 (e.g., client device 1 210-1, client device 2 210-2, and client device 3 210-3) for a collusion attack. Each of the client devices 210 receives the watermarks assigned according to the method shown and described above with reference to FIG. 2. The monitor 113 records clips of watermark embedded content from pirate service 1 120-1 one after another and uploads the sub-clips to the watermark detector 114 on the server 110 (FIG. 1). Assuming each part or sub-clip is 1 minute, e.g., 1 minute each for part 1 310-1, part 2 310-2, part 3 310-3, part 4 310-4, . . . , part N 310-N, according to the information in Table 1 above, after the first part, e.g., a 1-minute segment, the watermark detector considers each client as a potential colluder in step 320 and coordinates with the anti-collusion correlator to calculate a score for each client.

In some embodiments, at each state of the collusion state machine 1 130-1, the watermark detector and/or the anti-collusion correlator obtain pirate ID(s) (e.g., client IDs that are suspected of piracy or contributing to piracy) with a high confidence in step 330. Further, in some embodiments, the system checks whether a stable collusion state criterion is satisfied in step 335. Once the stable collusion state criterion is met for a respective state ("Yes"-branch from step 335), a list of clients is obtained in step 340 as suspected pirate(s) using colluding devices, e.g., client device 1 210-1, client device 2 210-2, and client device 3 210-3 to contribute to pirate service 1 120-1. Accordingly, the upload by the monitor 113 stops once the stable collusion state criterion is met and a set of suspected pirates has been identified. On the other hand, though not shown in FIG. 3C, in the case of not reaching the stable collusion state criterion ("No"-branch from step 335), the system continues accumulating part(s) uploaded by the monitor 113 and attempts the detection and correlation process upon receiving more part(s). The stable collusion state checks and the session termination are further illustrated and described with reference to FIGS. 4A-4B and 5.

In some embodiments, instead of attempting the iterative detection and correlation for each part, the watermark detector accumulates a number of parts before attempting the detection and correlation. For example, the watermark detector can determine that one part is insufficient for detecting a non-colluding pirate. Accordingly, the watermark detector obtains the second part recorded and uploaded by the monitor before determining whether there are sufficient parts to attempt to detect piracy. The accumulation continues such that having determined that two parts are insufficient for detecting a non-colluding pirate, e.g., accumulating segments from the two parts to a 2-minute clip, the watermark detector obtains the third part recorded by the monitor before determining whether there are sufficient parts to attempt detecting piracy. In such embodiments, after obtaining three parts, the watermark detector determines that the aggregated clip size has reached the first state in the collusion state machine 1 130-1, e.g., more than 2.4 minutes. The watermark detector, in conjunction with the anti-collusion correlator 115, then performs detection and correlation. The multi-part uploads process continues for each state until a stable collusion state is reached, as will be described in further detail below.

As shown in FIGS. 3A-3C, during the multi-part upload process, the watermark detector 114 decides whether the detection results are stable for identifying a set number of colluders. In the example shown in FIG. 3B, the server may detect and correlate on the part(s) when appropriate, e.g., trying the detection and correlation of non-colluding pirate in a first state using 3 parts, trying the detection and correlation of 2 colluders in a second state using 7 parts, and/or trying the detection and correlation of 3 colluders in a third state using 14 parts, etc., until the detection results are stable for identifying the set of three colluders at the client devices 210 for pirate service 1 120-1. As such, various parts enable variable detection rates, and the number of parts accumulated for detection and correlation depends on the number of colluders for a respective pirate service as the system cannot know in advance for the respective pirate service whether the collusion is finished and/or the number of pirate(s) for the respective pirate service.

Figure 4A:
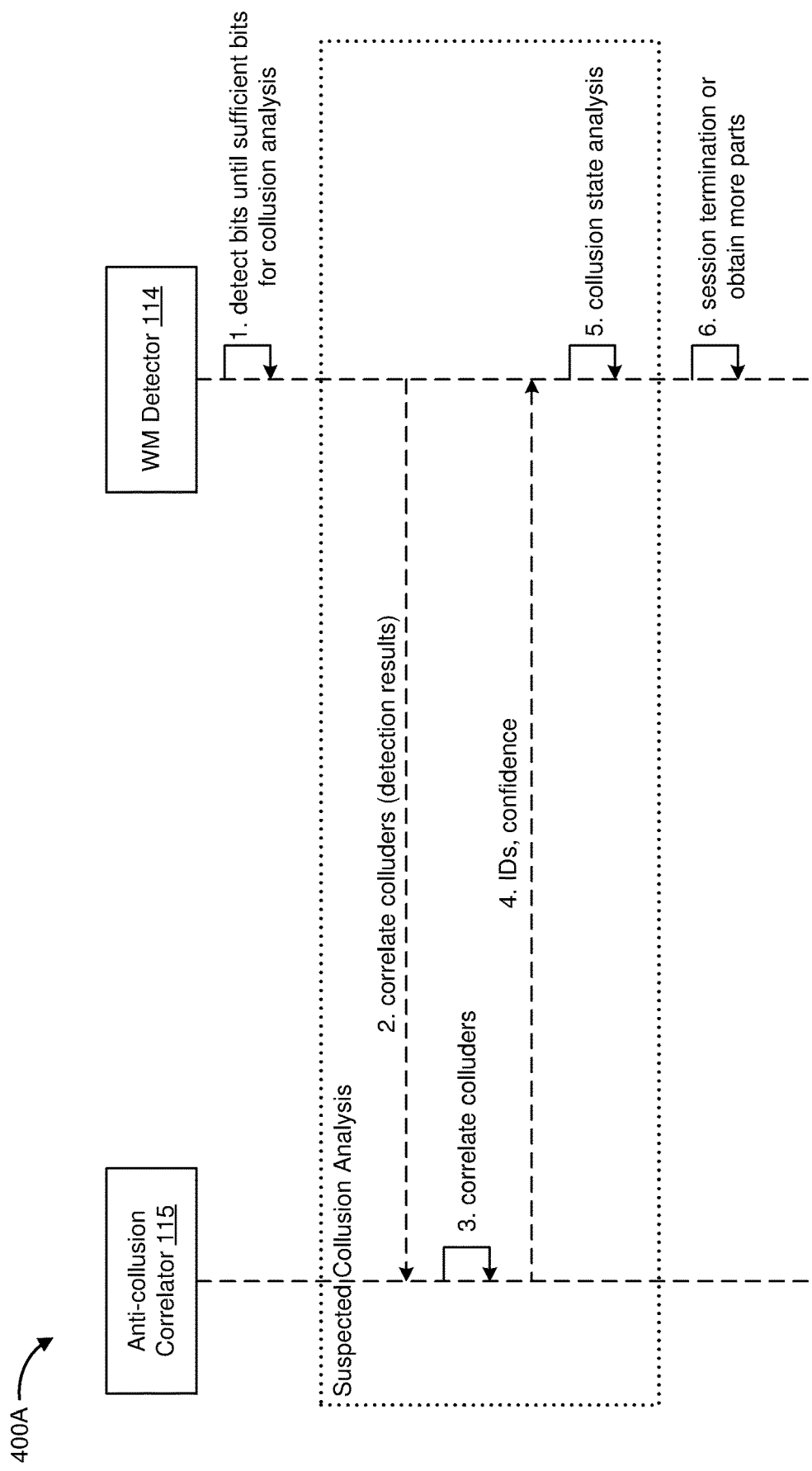
FIGS. 4A and 4B are diagrams illustrating an iterative piracy detection and correlation process for identifying pirates, in accordance with some embodiments.

FIG. 4A is a sequence diagram 400A illustrating an iterative piracy detection and correlation process for identifying pirates in accordance with some embodiments. In step 1, the watermark detector 114 detects the watermark in the accumulated content received from the monitor until there are sufficient watermark bits for colluder detection in various states in the collusion state machine. For example, according to the information in Table 1, the watermark detector 114 accumulates at least 24 bits of watermark before attempting to detect non-colluding pirates, accumulates at least 150 bits of watermark before attempting to detect 2-colluder pirates, or accumulates at least 290 bits of watermark before attempting to detect 3-colluder pirates, etc. In some embodiments, as described above with reference to FIGS. 3A-3C, the watermark detector 114 attempts the detection after receiving each part uploaded by the monitor.

Figure 4B:
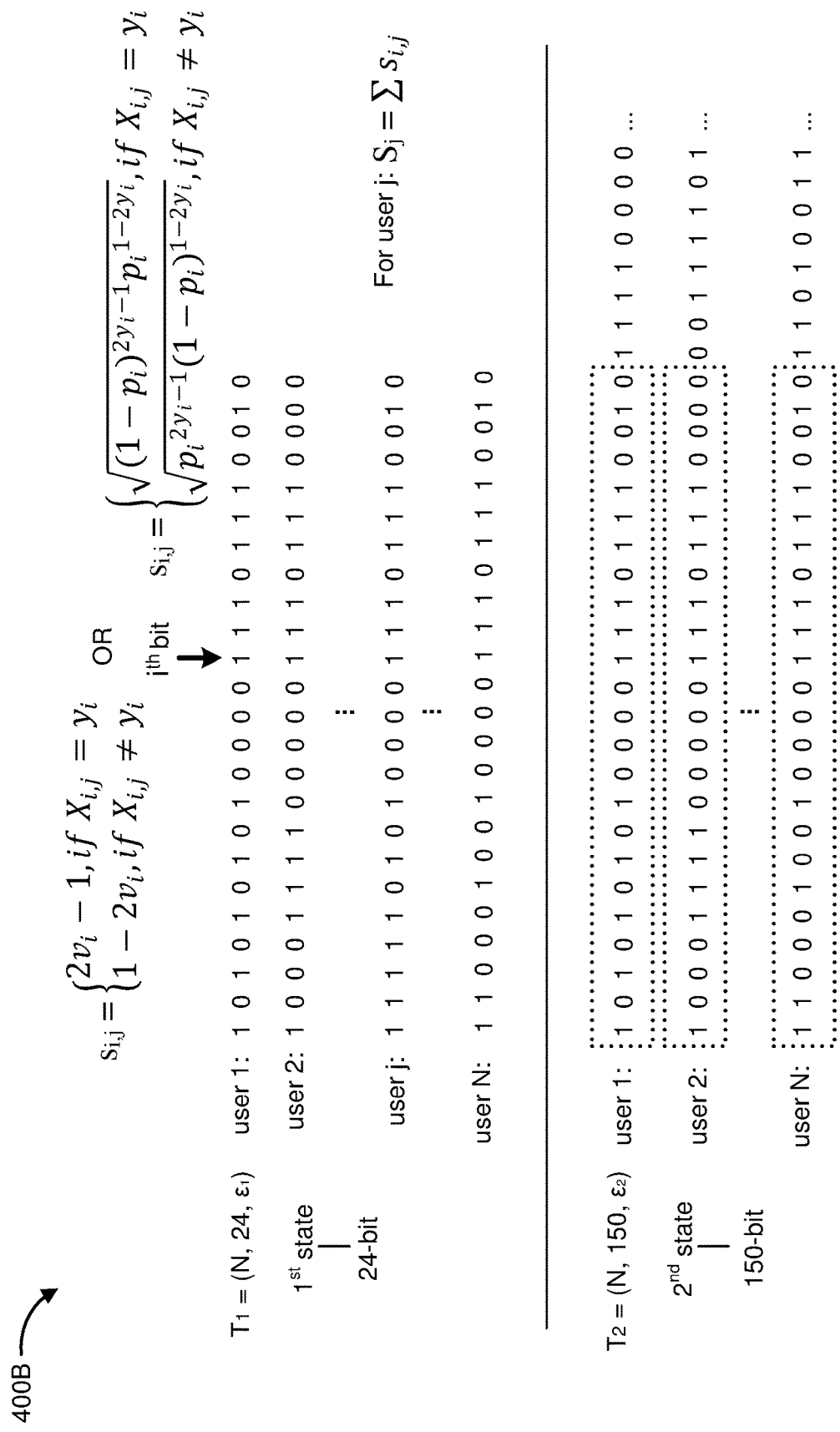

Starting from step 2, the watermark detector 114 performs suspected collusion analysis. In step 2, the anti-collusion correlator 115 receives the detected bits from the watermark detector 114, e.g., the colluding watermark bits collected from the pirate service and uploaded by the monitor, and compares the bits against the assigned bits of users watching the session (or the assigned bits of subscribers) in step 3 to correlate colluders. In some embodiments, the suspected collusion analysis takes into account both high and low confidence bit readings. For example, FIG. 4B is a diagram 400B illustrating collusion correlation in accordance with some embodiments. As shown in FIG. 4B, for the bits aggregated at the current point from the multi-part uploads, scores are calculated for potential users.

For user j, where $0<=j<N$ and N is the user population size, a total score $S_j$ as the confidence score is calculated as a summation of scores for each watermark bit, e.g., $S_j=\Sigma s_{i,j}$, where $s_{i,j}$ is the score for the $i^{th}$ watermark bit from the watermark detector calculated for user j, $0<=i<m$, and m is the total number of accumulated bits from the multi-part uploads at the current moment. In some embodiments, the user population size (N) corresponds to the users watching a session of media content if such a list of users is available. In the case of not having the number of users watching a session of media content, the system uses the number of subscribers as the value of N.

To calculate the score $s_{i,j}$, in some embodiments, the anti-collusion correlator determines according to which subsequence type the $i^{th}$ bit is assigned to and calculates the score based on various function(s) corresponding to the respective subsequence type. For example, in the case of the watermark unit 112 assigned bits according to two subsequence types as described above with reference to FIG. 2, the anti-collusion correlator 115 uses the following functions for determining the score $s_{i,j}$ for $i^{th}$ bit that is assigned according to the first subsequence type.

$$s_{i,j} = \begin{cases} 2v_i - 1, & \text{if } X_{i,j} = y_i \\ 1 - 2v_i, & \text{if } X_{i,j} \neq y_i \end{cases}$$

where:
$X_{i,j}$ is the value of $i^{th}$ bit assigned to user j, e.g., bit i of the anti-collusion code for user j as described above with reference to FIG. 2;

$y_i$ is the detected watermark value for $i^{th}$ bit from the watermark detector; and $v_i$ is a probability of bit i to get true value in the watermark detection process.

In some embodiments, $v_i$ is defined by the bit confidence level calculated by the watermark detector process, e.g., $0.5<=v_i<=1$. On the other hand, in the case of the $i^{th}$ bit being assigned according to the second subsequence type, the anti-collusion correlator uses the following functions for determining the score $s_{i,j}$ for the $i^{th}$ bit.

$$s_{i,j} = \begin{cases} \sqrt{(1-p_i)^{2y_i-1} p_i^{1-2y_i}}, & \text{if } X_{i,j} = y_i \\ \sqrt{p_i^{2y_i-1}(1-p_i)^{1-2y_i}}, & \text{if } X_{i,j} \neq y_i \end{cases}$$

where $p_i$ is the probability of bit i to be assigned by value 1 according to the distribution for the second subsequence type as described and shown in FIG. 2, e.g., $0<=p_i<=1$.

Further, for each number of users (N), the number of bits (m), and the acceptable false possible level (f) (e.g., the false positive defined as a chance to accuse an innocent user), a threshold T=T(N, m, f) is defined for the state. Users having scores higher than T are declared as colluders, e.g., user j with $S_j>T$ is considered a colluder, and the identifiers associated with such users (e.g., account ID, device ID, session ID, etc.) along with the score $S_j$ representing the confidence for each identified colluder are recorded.

In the example shown in FIG. 4B, for the first state, the system accumulates 24-bit watermark for the detection and correlation and defines a threshold $T_1$ as (N, 24, $\varepsilon_1$) for identifying a non-colluding pirate, where $\varepsilon_1$ represents an acceptable false positive level for the first state. When the collusion state machine enters the second state, the system accumulates 150-bit watermark for the detection and correlation and defines a threshold $T_2$ as (N, 150, $\varepsilon_2$) for identifying 2 colluders, where $\varepsilon_1$ represents an acceptable false positive level for the second state. Further, as indicated by the boxes with dotted borders, the server reuses the first 24 bits already detected and extracts (e.g., from the first three parts, part 1 310-1, part 2 310-2, and part 3 310-3 as shown in FIG. 3B), extracts additional bits from the additional parts (e.g., another 4 parts starting from part 4 310-4), and concatenates the first 24 bits with the additional bits until accumulating 150-bit for the detection, correlation, and identification of colluders in the second state. As such, reusing the bits already detected and extracted in the first state allows efficient processing during the second state.

Referring back to FIG. 4A, in step 4, the anti-collusion correlator 115 returns the identifiers of the colluders (e.g., user IDs, client device IDs, account IDs, etc.) and the confidence scores (e.g., $S_j$ for each user) to the watermark detector 114. In step 5, in some embodiments, the watermark detector 114 performs the collusion state analysis. For example, the watermark detector 114 can determine the number of users satisfying the condition Sj>T at the current collusion state. Based on the collusion state analysis, in step 6, the watermark detector 114 terminates the session or obtains more parts from the monitor for further analysis according to session termination policies as shown and described below with reference to FIG. 5. For example, in the case of no users satisfying the condition Sj>T is found, the watermark detector 114 can ask the monitor for another part of the video. In another example, the watermark detector 114 can define a set of suspicious users having a significant probability to be a colluder, e.g., Sj>T, and store the set of suspicious users in the pirate list 116 (FIG. 1).

Figure 5:
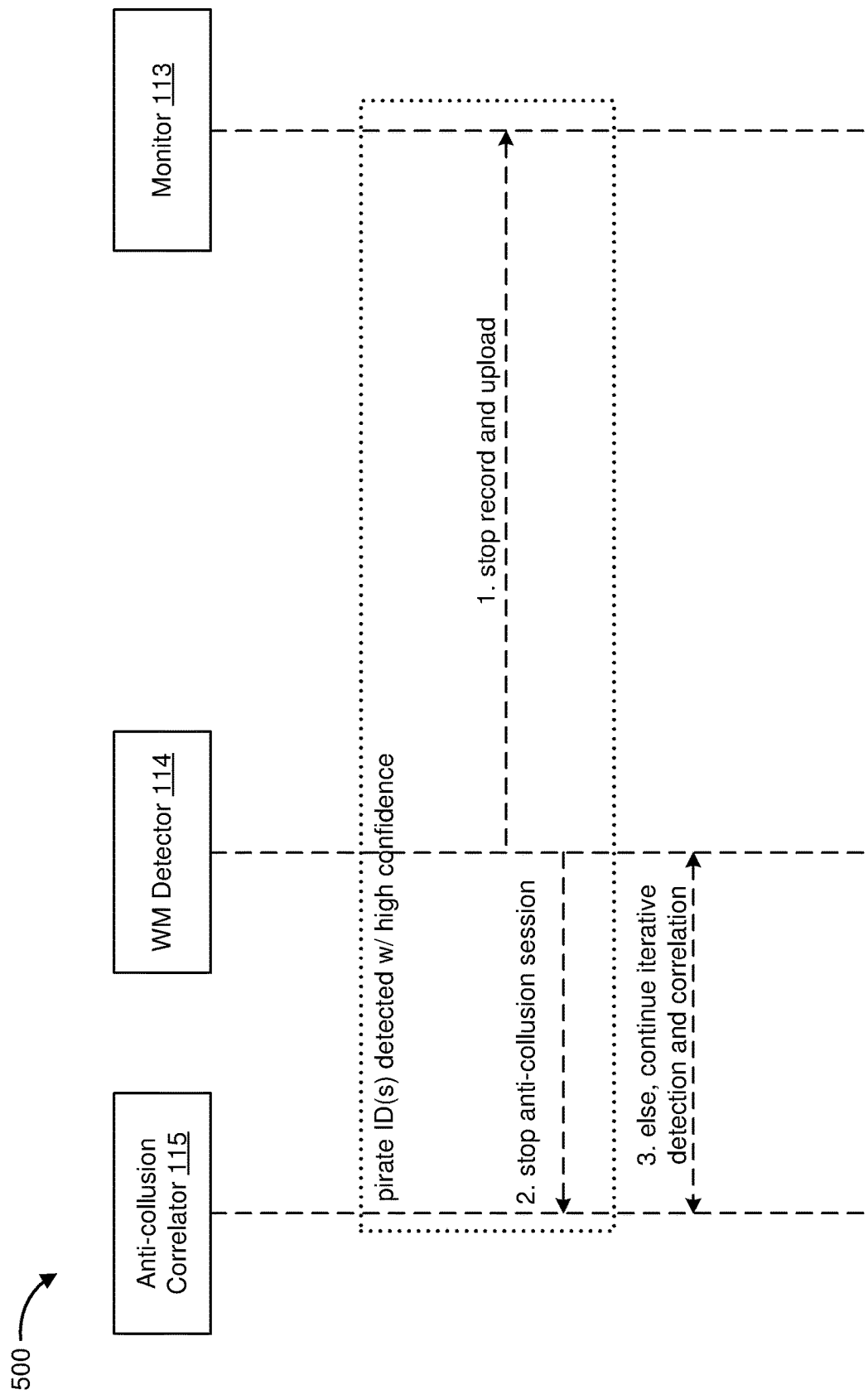
FIG. 5 is a sequence diagram illustrating the execution of an exemplary session termination policy, in accordance with some embodiments.

FIG. 5 is a sequence diagram 500 illustrating the execution of an exemplary session termination policy in accordance with some embodiments. In some embodiments, based on the analysis by the watermark detector as described above with reference to FIG. 4A, the watermark detector determines whether the collusion results are stable at the current collusion state and whether more clip parts are required for further analysis. In the case of the colluder ID(s) being detected with high confidence, the watermark detector 114 instructs the monitor 113 to stop recording and uploading clips in step 1 and instructs the anti-collusion correlator 115 to stop the anti-collusion session. On the other hand, in the case of requiring more parts for further analysis, the watermark detector 114 waits for more parts and facilitates another retry of the iterative collusion detection and correlation by the anti-collusion correlator 115 in step 3.

Figure 6A:
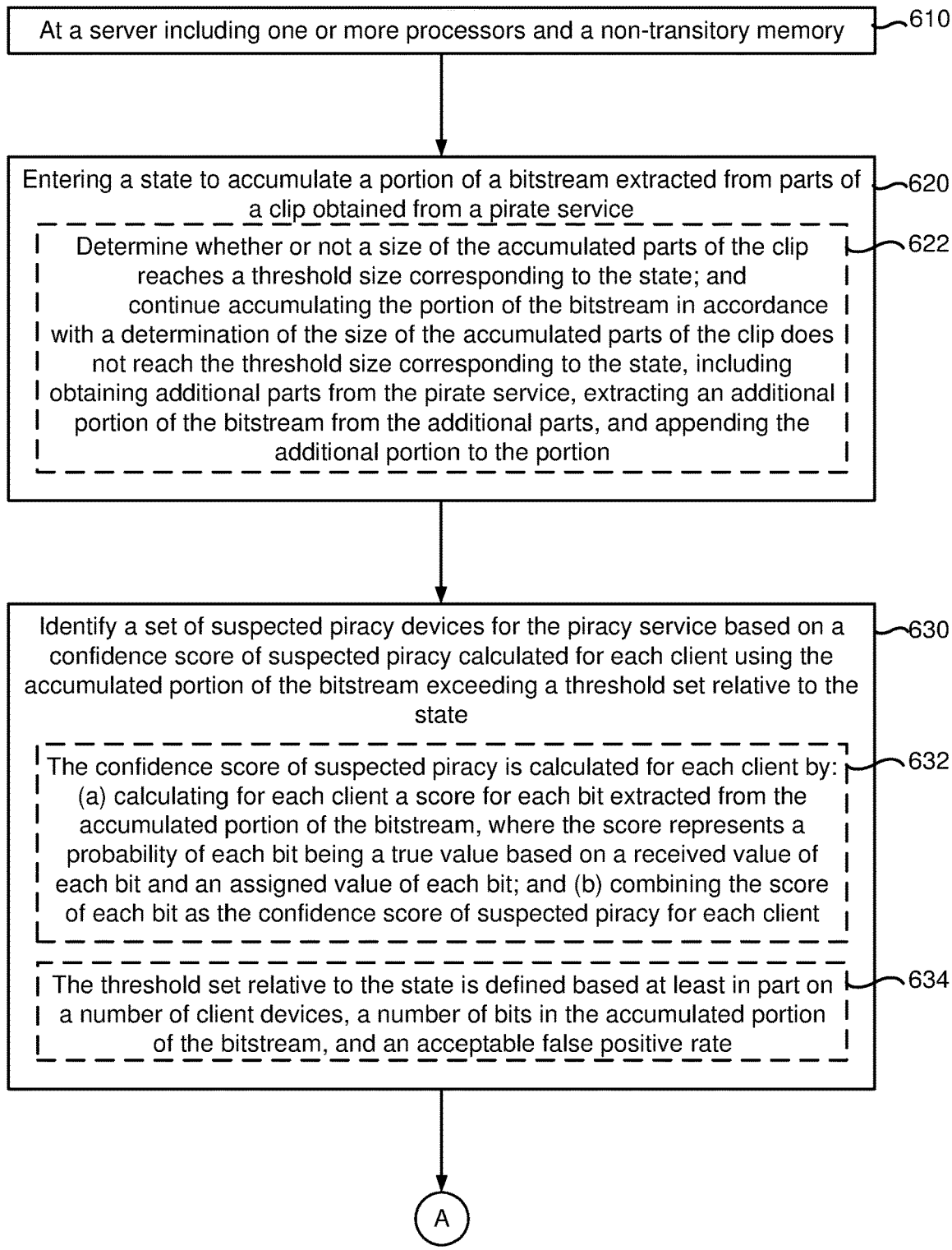
Figure 6B:
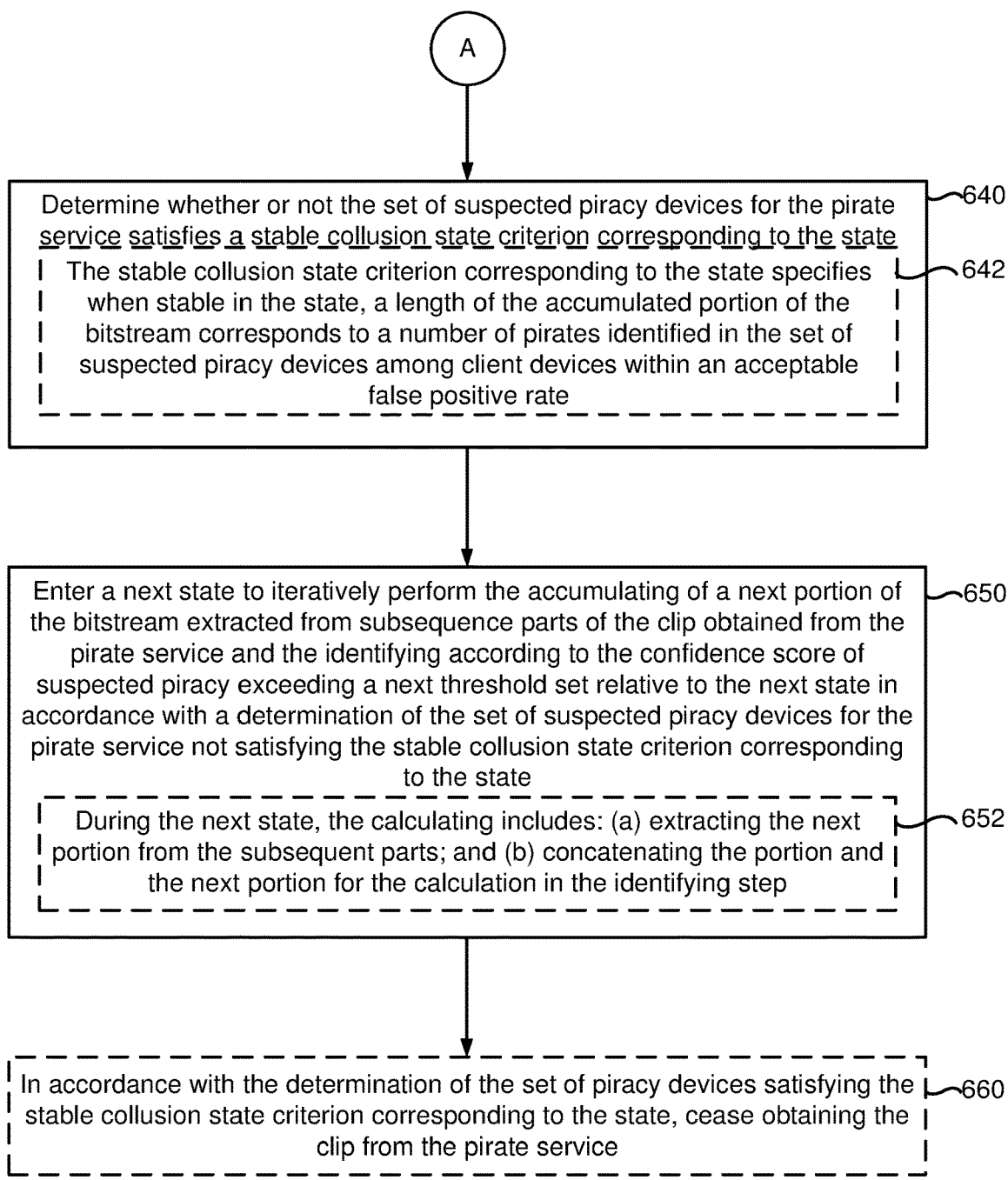

FIGS. 6A-6C are flow diagrams illustrating an anti-piracy method 600 in accordance with some embodiments. As represented by block 610 in FIG. 6A, in some embodiments, the method 600 is performed at a server that includes one or more processors and a non-transitory memory, e.g., the server 110 in FIG. 1. The method 600 begins with the server entering a state to accumulate a portion of a bitstream extracted from parts of a clip obtained from a pirate service. As represented by block 622, in some embodiments, entering the state to accumulate the parts of the clip obtained from the pirate service includes: determining whether or not a size of the accumulated parts of the clip reaches a threshold size corresponding to the state; and continuing accumulating the portion of the bitstream in accordance with a determination of the size of the accumulated parts of the clip does not reach the threshold size corresponding to the state, including obtaining additional parts from the pirate service, extracting an additional portion of the bitstream from the additional parts, and appending the additional portion to the portion. For example, as shown in FIG. 3A, upon each upload, the watermark detector 114 executes the detection attempt policy to decide whether detection and/or correlation would be attempted based on the information accumulated or whether more parts would be obtained. In another example, when executing collusion state machine 1 130-1, the monitor 113 starts with obtaining the smallest clip comprising 3 parts from the pirate service 1 120-1.

The method 600 continues, as represented by block 630, with the server identifying a set of suspected piracy devices for the piracy service based on a confidence score of suspected piracy calculated for each client using the accumulated portion of the bitstream exceeding a threshold set relative to the state. In some embodiments, as represented by block 632, the confidence score of suspected piracy is calculated for each client by: (a) calculating for each client a score for each bit extracted from the accumulated portion of the bitstream, where the score represents a probability of each bit being a true value based on a received value of each bit and an assigned value of each bit; and (b) combining the score of each bit as the confidence score of suspected piracy for each client. Further, as represented by block 634, in some embodiments, the threshold set relative to the state is defined based at least in part on a number of client devices, a number of bits in the accumulated portion of the bitstream, and an acceptable false positive rate.

For example, as shown in FIG. 4A, in step 1, the watermark detector 114 detects watermark bits in the uploaded parts and accumulates sufficient bits for collusion analysis. Further as shown in FIG. 4A, in steps 2-5, the anti-collusion correlator 115 and the watermark detector 114 correlate and identify the identifiers of pirates as well as determine whether to enter the next state of the collusion state machine based on the detected watermark bits. In another example, as shown in FIG. 4B, for each user at each client device, the server (e.g., the anti-collusion correlator 115 in FIGS. 1, 3A, and 4A) calculates a confidence score of suspected piracy $S_j$, where the score $S_j$ is calculated as a summation of scores $s_{i,j}$ for bits detected and extracted in the accumulated bitstream, e.g., $S_j=\Sigma s_{i,j}$, where $0 \le j < N$, N is the user population size, $0 \le i < m$, m is the total number of bits from the accumulated multi-part uploads at the current moment. Further as shown in FIG. 4B, for each number of users (N), the number of bits (m), and the acceptable false possible level f (e.g., a chance to accuse an innocent user), a threshold T=T(N, m, f) is defined, e.g., m being 24 in the first state of collusion state machine 1 130-1 shown in FIG. 3B. The server (e.g., the anti-collusion correlator 115 in FIGS. 1, 3A, and 4A) identifies users having scores higher than T as colluders. As such, in some embodiments, in step 3 of FIG. 4A, the anti-collusion correlator 115 compares the confidence score of suspected piracy $S_j$ calculated for each client device with the threshold T defined for the state.

Turning to FIG. 6B, as represented by block 640, the method 600 continues with the server determining whether or not the set of suspected piracy devices for the pirate service satisfies a stable collusion state criterion corresponding to the state. As represented by block 642, in some embodiments, the stable collusion state criterion corresponding to the state specifies when stable in the state, a length of the accumulated portion of the bitstream corresponds to a number of pirates identified in the set of suspected piracy devices among client devices within an acceptable false positive rate.

For example, as described above with reference to Table 1, the number of bits used for collusion detection can be Tardos bits and the number of Tardos bits for detecting various numbers of colluders can be expressed as number of Tardos bits=$O(c^2 * \log n/\varepsilon)$; wherein c represents the number of colluders; n represents population size; and $\varepsilon$ represents an acceptable false positive rate. As shown in FIG. 3B, using the example in Table 1, a stable collusion state criterion corresponding to the first state of collusion state machine 1 130-1 can specify when in the stable state, one pirate (e.g., 0 colluder) is identified among the client devices 210 as being in the suspected piracy device for pirate service 1 120-1 after accumulating three parts of the clip obtained from pirate service 1 120-1 with 24 bits of watermark embedded. In another example, also as shown in FIG. 3B and using the example in Table 1, a stable collusion state criterion corresponding to the second state of collusion state machine 1 130-1 can specify when in the stable state, two pirates (e.g., 2 colluders) are identified among the client devices 210 as being in the suspected piracy device for the pirate service 120-1 after accumulating seven parts of the clip obtained from pirate service 1 120-1 with 150 bits of watermark embedded. In yet another example, in FIG. 3B, using the example in Table 1, a stable collusion state criterion corresponding to the third state of collusion state machine 1 130-1 can specify when in the stable state, three pirates (e.g., 3 colluders) are identified among the client devices 210 as being in the suspected piracy device for pirate service 1 120-1 after accumulating fourteen parts of the clip obtained from pirate service 1 120-1 with 290 bits of watermark embedded.

Still referring to FIG. 6B, as represented by block 650, the method 600 continues with the server entering a next state to iteratively perform the accumulating of a next portion of the bitstream extracted from subsequence parts of the clip obtained from the pirate service and the identifying according to the confidence score of suspected piracy exceeding a next threshold set relative to the next state in accordance with a determination of the set of suspected piracy devices for the pirate service not satisfying the stable collusion state criterion corresponding to the state. As represented by block 652, in some embodiments, during the next state, the calculating includes: (a) extracting the next portion from the subsequent parts; and (b) concatenating the portion and the next portion for the calculation in the identifying step. For example, FIG. 1, for each pirate service 120, the server 110 executes the collusion state machine 130 and iteratively goes through various state(s) until pirate(s) for the pirate service 120 are identified. Further as shown in FIG. 4B, when calculating the confidence score of the suspected piracy for each user, the server uses the watermark bits detected and extracted from the previous state to improve efficiency, e.g., using the 24-bit watermark in the first state and concatenating with another 126 bits of watermark extracted from the additional parts for the calculation of the confidence scores for the second state.

In some embodiments, as represented by block 660, the method 600 further includes ceasing obtaining the clip from the pirate service in accordance with the determination of the set of piracy devices satisfying the stable collusion state criterion corresponding to the state. For example, as shown in FIG. 5, once the identifier(s) of the pirate(s) are detected and identified with high confidence, the watermark detector 114 instructs the monitor 113 to stop the recording and the uploading of clips from the pirate service(s) in step 1 and instructs the anti-collusion correlator 115 to stop the anti-collusion session in step 2. In some embodiments, the server also disrupts services to the set of suspected piracy devices.

Turning to FIG. 6C, in some embodiments, as represented by block 670, the method 600 further includes for each client, obtaining a first subsequence of random bits based on a first probability density function, obtaining a second subsequence of random bits based on a second probability density function, different from the first probability density function, mixing the first subsequence of random bits with the second subsequence to generate the bitstream, and embedding the bitstream in a media content item for distribution to each client. In such embodiments, as represented by block 672, an error correction subsequence is generated according to the first probability density function, e.g., specifying each bit in the first subsequence of random bits having a probability value of 0.5 to be 0 or 1 or using other error correction codes such as Hadamard codes in accordance with some embodiments. Also in such embodiments, as represented by block 674, the second probability density function includes a colluder tracing function in accordance with some embodiments. Further, in such embodiments, as represented by block 676, the confidence score of suspected piracy is calculated for each client by: (a) determining whether a respective bit in the accumulated portion of the bitstream is assigned as part of the first subsequence of random bits or the second subsequence of random bits; (b) applying a first function for calculating a score of the respective bit in accordance with determining the respective bit is assigned as part of the first subsequence of random bits; and (c) applying a second function for calculating the score of the respective bit in accordance with determining the respective bit is assigned as part of the second subsequence of random bits.

For example, as shown in FIG. 2, the sequence for watermark x or watermark y is a mixture of bits from the first subsequence type, e.g., a sequence of random bits where each bit has a probability of 0.5 to be 0 or 1, and bits from the second subsequence type, e.g., a Tardos arcsine distribution as a colluder tracing function. In another example, as shown in FIG. 4B, for each user, the server calculates a score for each bit of the extracted watermark bits. When calculating the score, the server determines whether it is assigned according to the first subsequence type or the second subsequence type and uses different functions for calculating the score for each bit.

Referring back to FIG. 6C, in some embodiments, as represented by block 680, in some embodiments, the method 600 further includes entering states to identify sets of suspected piracy devices in parallel for multiple pirate services based on confidence scores of suspected piracy calculated for each client using the accumulated portion of the bitstream, where a first state entered for a first pirate service of the multiple pirate services is independent of a second state entered for a second pirate service of the multiple pirate services. For example, in FIG. 1, the operation of collusion state machine 1 130-1 is in parallel and independent of the operation of collusion state machine 2 130-2 or collusion state machine 3 130-3. As such, parallel piracy detection and correlation processes are performed across multiple pirate services 120, where the number of colluders of any pirate service 120 is unknown in advanced and the piracy detection and correlation of pirate service 1 120-1 does not affect the collusion detection and correlation of pirate service 2 120-2 or pirate service 3 120-3.

Figure 7:
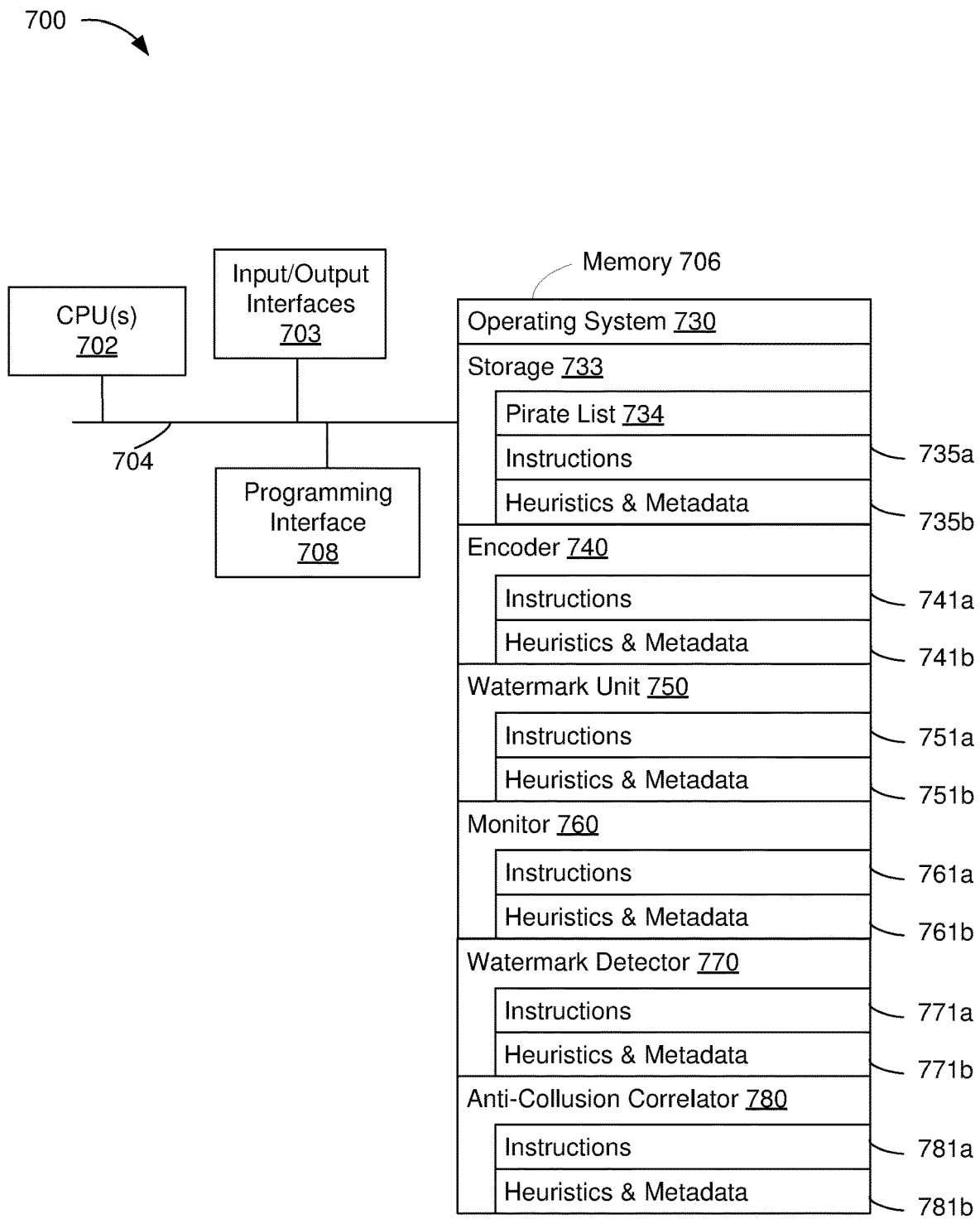
FIG. 7 is a block diagram of a computing device for anti-piracy, in accordance with some embodiments.

FIG. 7 is a block diagram of a computing device 700 for anti-piracy in accordance with some embodiments. In some embodiments, the computing device 700 performs one or more functions of the server 110 in FIG. 1 and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPUs) 702 (e.g., processors), one or more input/output interfaces 703 (e.g., input devices, sensors, a network interface, a display, etc.), a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 733, an encoder 740, a watermark unit 750, a monitor 760, a watermark detector 770, and an anti-collusion correlator 780. In some embodiments, one or more instructions are included in a combination of logic and non-transitory memory. The operating system 730 includes procedures for handling various basic system services and for performing hardware dependent tasks.

In some embodiments, the storage module 733 further includes a pirate list 734 (e.g., the pirate list 116, FIG. 1), which stores identifiers of suspected pirates, e.g., user IDs, device IDs, and/or account IDs of suspected pirates. To that end, the storage module 733 includes a set of instructions 735a and heuristics and metadata 735b.

In some embodiments, the encoder 740 (e.g., the encoder 111, FIG. 1) is configured to encode multimedia content (e.g., videos, audio, text, etc.) embedded with watermark bits provided by the watermark unit 750. To that end, the encoder 740 includes a set of instructions 741a and heuristics and metadata 741b.

In some embodiments, the watermark unit 750 (e.g., the watermark unit 112, FIG. 1) is configured to assign watermark bits and/or embed the watermark bits to the multimedia content encoded by the encoder 740. To that end, the watermark image embedder 750 includes a set of instructions 751a and heuristics and metadata 751b.

In some embodiments, the monitor 760 (e.g., the monitor 113, FIG. 1) is configured to monitor multimedia content consumption and/or distribution and collects clips and/or parts of watermark embedded content to upload to the server for piracy detection. To that end, the monitor 760 includes a set of instructions 761a and heuristics and metadata 761b.

In some embodiments, the watermark detector 770 (e.g., the watermark detector 114, FIG. 1) is configured to coordinate with the anti-collusion correlator 780 to analyze the clips and/or parts uploaded by the monitor 760 and detect the pirates. To that end, the watermark detector 770 includes a set of instructions 771a and heuristics and metadata 771b.

In some embodiments, the anti-collusion correlator 780 (e.g., the anti-collusion correlation 115, FIG. 1) is configured to coordinate with the watermark detector 770 to analyze the clips and/or parts uploaded by the monitor 760 and correlates the identifiers of pirates. To that end, the anti-collusion correlator 780 includes a set of instructions 781a and heuristics and metadata 781b.

Although the storage module 733, the encoder 740, the watermark unit 750, the monitor 760, the watermark detector 770, and the anti-collusion correlator 780 are illustrated as residing on a single computing device 700, it should be understood that in other embodiments, any combination of the storage module 733, the encoder 740, the watermark unit 750, the monitor 760, the watermark detector 770, and the anti-collusion correlator 780 can reside in separate computing devices in various embodiments. For example, in some embodiments, each of the storage module 733, the encoder 740, the watermark unit 750, the monitor 760, the watermark detector 770, and the anti-collusion correlator 780 resides on a separate computing device.

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a server including one or more processors and a non-transitory memory:
entering a state to accumulate a portion of a bitstream extracted from parts of a clip obtained from a pirate service;
identifying a set of suspected piracy devices for the piracy pirate service based on a confidence score of suspected piracy calculated for each client device using the accumulated portion of the bitstream exceeding a threshold set relative to the state, wherein the confidence score of suspected piracy for a respective client device is calculated by calculating a respective score for a respective bit extracted from the accumulated portion of the bitstream, wherein the score represents a probability of the respective bit being a true value based on a received value of the respective bit and an assigned value of the respective bit, and combining scores of bits as the confidence score of suspected piracy for the respective client device;
determining whether or not the set of suspected piracy devices for the pirate service satisfies a stable collusion state criterion corresponding to the state; and
entering a next state to iteratively perform the accumulating of a next portion of the bitstream extracted from subsequence parts of the clip obtained from the pirate service and the identifying according to the confidence score of suspected piracy exceeding a next threshold set relative to the next state in accordance with a determination of the set of suspected piracy devices for the pirate service not satisfying the stable collusion state criterion corresponding to the state.

2. The method of claim 1, wherein entering the state to accumulate the portion of the bitstream extracted from the parts of the clip obtained from the pirate service includes:
determining whether or not a size of the accumulated parts of the clip reaches a threshold size corresponding to the state; and
continuing accumulating the portion of the bitstream in accordance with a determination of the size of the accumulated parts of the clip does not reach the threshold size corresponding to the state, including obtaining additional parts from the pirate service, extracting an additional portion of the bitstream from the additional parts, and appending the additional portion to the portion.

3. The method of claim 1, wherein the threshold set relative to the state is defined based at least in part on a number of client devices, a number of bits in the accumulated portion of the bitstream, and an acceptable false positive rate.

4. The method of claim 1, wherein the stable collusion state criterion corresponding to the state specifies when stable in the state, a length of the accumulated portion of the bitstream corresponds to a number of pirates identified in the set of suspected piracy devices among client devices within an acceptable false positive rate.

5. The method of claim 1, wherein during the next state, the calculating includes:
extracting the next portion from subsequent parts; and
concatenating the portion and the next portion for the calculation in the identifying step.

6. The method of claim 1, further comprising:
ceasing obtaining the clip from the pirate service in accordance with the determination of the set of piracy devices satisfying the stable collusion state criterion corresponding to the state.

7. The method of claim 1, further comprising, for the respective client device:
obtaining a first subsequence of random bits based on a first probability density function;

obtaining a second subsequence of random bits based on a second probability density function, different from the first probability density function;

mixing the first subsequence of random bits with the second subsequence to generate the bitstream; and embedding the bitstream in a media content item for distribution to each the respective client device.

8. The method of claim 7, wherein an error correction subsequence is generated according to the first probability density function.

9. The method of claim 7, wherein the second probability density function includes a colluder tracing function.

10. The method of claim 7, wherein the confidence score of suspected piracy is calculated for the respective client device by:

determining whether a respective bit in the accumulated portion of the bitstream is assigned as part of the first subsequence of random bits or the second subsequence of random bits;

applying a first function for calculating a score of the respective bit in accordance with determining the respective bit is assigned as part of the first subsequence of random bits; and applying a second function for calculating the score of the respective bit in accordance with determining the respective bit is assigned as part of the second subsequence of random bits.

11. The method of claim 1, further comprising:

entering states to identify sets of suspected piracy devices in parallel for multiple pirate services based on confidence scores of suspected piracy calculated for each client device using the accumulated portion of the bitstream, wherein a first state entered for a first pirate service of the multiple pirate services is independent of a second state entered for a second pirate service of the multiple pirate services.

12. A device comprising:

one or more processors;

a non-transitory memory; and one or more programs stored in the non-transitory memory, which, when executed by the one or more processors, cause the device to:

enter a state to accumulate a portion of a bitstream extracted from parts of a clip obtained from a pirate service;

identify a set of suspected piracy devices for the piracy pirate service based on a confidence score of suspected piracy calculated for each client device using the accumulated portion of the bitstream exceeding a threshold set relative to the state, wherein the confidence score of suspected piracy for a respective client device is calculated by calculating a respective score for a respective bit extracted from the accumulated portion of the bitstream, wherein the score represents a probability of the respective bit being a true value based on a received value of the respective bit and an assigned value of the respective bit, and combining scores of bits as the confidence score of suspected piracy for the respective client device;

determine whether or not the set of suspected piracy devices for the pirate service satisfies a stable collusion state criterion corresponding to the state; and enter a next state to iteratively perform the accumulating of a next portion of the bitstream extracted from subsequence parts of the clip obtained from the pirate service and the identifying according to the confidence score of suspected piracy exceeding a next threshold set relative to the next state in accordance with a determination of the set of suspected piracy devices for the pirate service not satisfying the stable collusion state criterion corresponding to the state.

13. The device of claim 12, wherein entering the state to accumulate the portion of the bitstream extracted from the parts of the clip obtained from the pirate service includes:

determining whether or not a size of the accumulated parts of the clip reaches a threshold size corresponding to the state; and continuing accumulating the portion of the bitstream in accordance with a determination of the size of the accumulated parts of the clip does not reach the threshold size corresponding to the state, including obtaining additional parts from the pirate service, extracting an additional portion of the bitstream from the additional parts, and appending the additional portion to the portion.

14. The device of claim 12, wherein the threshold set relative to the state is defined based at least in part on a number of client devices, a number of bits in the accumulated portion of the bitstream, and an acceptable false positive rate.

15. The device of claim 12, wherein the stable collusion state criterion corresponding to the state specifies when stable in the state, a length of the accumulated portion of the bitstream corresponds to a number of pirates identified in the set of suspected piracy devices among client devices within an acceptable false positive rate.

16. The device of claim 12, wherein the one or more programs, which, when executed by the one or more processors, further cause the device to, in accordance with the determination of the set of piracy devices satisfying the stable collusion state criterion corresponding to the state:

disrupt services to the set of suspected piracy devices; and cease obtaining the clip from the pirate service.

17. The device of claim 12, the one or more programs, which, when executed by the one or more processors, further cause the device to, for the respective client device:

obtain a first subsequence of random bits based on a first probability density function;

obtain a second subsequence of random bits based on a second probability density function, different from the first probability density function;

mix the first subsequence of random bits with the second subsequence to generate the bitstream; and embed the bitstream in a media content item for distribution to the respective client device.

18. A non-transitory memory storing one or more programs, which, when executed by one or more processors of a device, cause the device to:

enter a state to accumulate a portion of a bitstream extracted from parts of a clip obtained from a pirate service;

identify a set of suspected piracy devices for the pirate service based on a confidence score of suspected piracy calculated for each client using the accumulated portion of the bitstream exceeding a threshold set relative to the state, wherein the confidence score of suspected piracy for a respective client device is calculated by calculating a respective score for a respective bit extracted from the accumulated portion of the bitstream, wherein the score represents a probability of the respective bit being a true value based on a received value of the respective bit and an assigned value of the respective bit, and combining scores of bits as the confidence score of suspected piracy for the respective client device;

determine whether or not the set of suspected piracy devices for the pirate service satisfies a stable collusion state criterion corresponding to the state; and enter a next state to iteratively perform the accumulating of a next portion of the bitstream extracted from subsequence parts of the clip obtained from the pirate service and the identifying according to the confidence score of suspected piracy exceeding a next threshold set relative to the next state in accordance with a determination of the set of suspected piracy devices for the pirate service not satisfying the stable collusion state criterion corresponding to the state.

* * * * *